(12) United States Patent
Kron

(10) Patent No.: US 8,661,519 B2
(45) Date of Patent: Feb. 25, 2014

(54) REDIRECTION USING TOKEN AND VALUE

(75) Inventor: Peter V. Kron, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 108 days.

(21) Appl. No.: 13/153,234

(22) Filed: Jun. 3, 2011

(65) Prior Publication Data

US 2012/0311689 A1     Dec. 6, 2012

(51) Int. Cl.
*G06F 7/04*     (2006.01)

(52) U.S. Cl.
USPC ................... 726/9; 726/20; 726/27; 713/165; 713/167

(58) Field of Classification Search
None
See application file for complete search history.

(56) References Cited

U.S. PATENT DOCUMENTS

| | | | |
|---|---|---|---|
| 6,199,113 B1 | 3/2001 | Alegre et al. | |
| 6,421,768 B1 | 7/2002 | Purpura | |
| 6,668,322 B1 | 12/2003 | Wood et al. | |
| 7,197,568 B2 * | 3/2007 | Bourne et al. | 709/229 |
| 7,216,236 B2 | 5/2007 | Kou et al. | |
| 7,240,192 B1 | 7/2007 | Paya et al. | |
| 7,644,434 B2 | 1/2010 | Pollutro et al. | |
| 7,676,834 B2 | 3/2010 | Camaisa et al. | |
| 2004/0210771 A1 * | 10/2004 | Wood et al. | 713/201 |

OTHER PUBLICATIONS

Replay Detection, Apr. 13, 2011 (Retrieved Date), (1 page).
Jos Dumortier, Combining Personalised Communications Services with Privacy-Friendly Identity Management, May 7, 2005.

* cited by examiner

*Primary Examiner* — Kaveh Abrishamkar
(74) *Attorney, Agent, or Firm* — Ben Tabor; David Andrews; Micky Minhas

(57) ABSTRACT

A client is redirected by a relying party to the supporting entity (such as an identity or claims provider). The relying party also sends a cookie that includes a nonce, and another copy of the nonce in a redirection context (e.g., in a context string). The client then communicates with the supporting entity to facilitate the supporting service, whereupon the supporting entity sends a validation token back to the client evidencing completion of the supporting service. The supporting party also sends the nonce back as part of the redirection context (e.g., in a context string). The client then sends a followup service request that includes the cookie, the nonce returned by the supporting entity, and the validation token to the relying party. The relying party may compare the nonce in the cookie with the nonce returned by the supporting entity to verify that the request is valid.

20 Claims, 6 Drawing Sheets

REDIRECTION USING TOKEN AND VALUE

BACKGROUND

In order to properly authenticate a client to a server, a conventional three party protocol is in use. The three parties include the client, the server (also called the relying party), and an identity provider, each being computing systems. The server is termed a "relying party" because it relies on the authentication of the client performed by the identity provider.

In this protocol, the client makes a service request to the relying party. Recognizing that the client is not authenticated yet, the relying party redirects the client to the identity provider. The identity provider authenticates the client, provides a security token to the client, and instructs the client to provide that security token back to the relying party. Those instructions are sometimes in the form of executable code that is automatically executed by the client causing the client to provide the security token to the relying party. The relying party then uses the security token to determine that the identity provider has indeed authenticated the client.

BRIEF SUMMARY

At least one embodiment described herein relates to the secure use of a supporting service computing system (e.g., an identity provider or claims provider) to facilitate a request from a client computing system (i.e., the "client") to a relying party computing system (i.e., the "relying party"), where the relying party computing system relies on the supporting service computing system (i.e., "supporting entity") to perform a supporting service (such as, for example authentication or claim providing). The client and the relying party interact, with embodiments directed towards the action of the client, and other embodiments directed towards the action of the relying party. The mechanisms described herein inhibit the feasibility of replay attacks. A "replay attack" is an attack whereby a malicious individual uses the request history (e.g., the browser history in the case of the client executing a browser) to re-access a web site that the individual has not previously authenticated to using a prior authentication of a legitimate user.

In one embodiment, the client submits a service request to a relying party, and is thereby redirected by the relying party to the supporting entity (such as an identity provider or a claims provider). In the redirection reply, the relying party also sends a cookie that includes a nonce, and also the nonce in a redirection context outside of the cookie (e.g., in a context string). In this context, a cookie is any structure that is returned to the relying party in subsequent requests, and a nonce is any value that is used only once between the client and the relying party at least within the valid time of the nonce. The client then communicates with the supporting entity to facilitate the supporting service, whereupon the supporting entity sends a validation token back to the client evidencing completion of the supporting service. The supporting party also sends the nonce back as part of the redirection context (e.g., in a context string). The client then sends a followup service request that includes the cookie, the nonce returned by the supporting entity, and the validation token to the relying party. The relying party may then use the validation token to determine that the supporting service has been performed, and may compare the nonce in the cookie with the nonce returned by the supporting entity. If there is a match, then the followup request is a valid request, and is not a replay request.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a client is redirected to a supporting entity (such as an identity or claims provider) when submitting a request initially to a relying party computing system. The relying party also returns a value (such as a nonce) that is in a redirection context such that the client submits the value to the supporting entity, whereupon that value is returned by the supporting entity along with a security token upon completion of the supporting service. The client also receives a cookie containing the value (perhaps in encrypted and/or signed form) to the client. The client responds to the completion of the supporting service by sending a followup service request to the relying party, perhaps in response to executing code provided by the supporting entity. The cookie is also returned in that followup service request. The relying party may compare the nonce in the cookie with the nonce returned by the supporting entity to verify that the request is valid and not a replay request. First, some introductory discussion regarding computing systems will be described with respect to FIG. 1. Then, the embodiments of the secure redirection will be described with respect to FIGS. 2 through 8.

Figure 1:
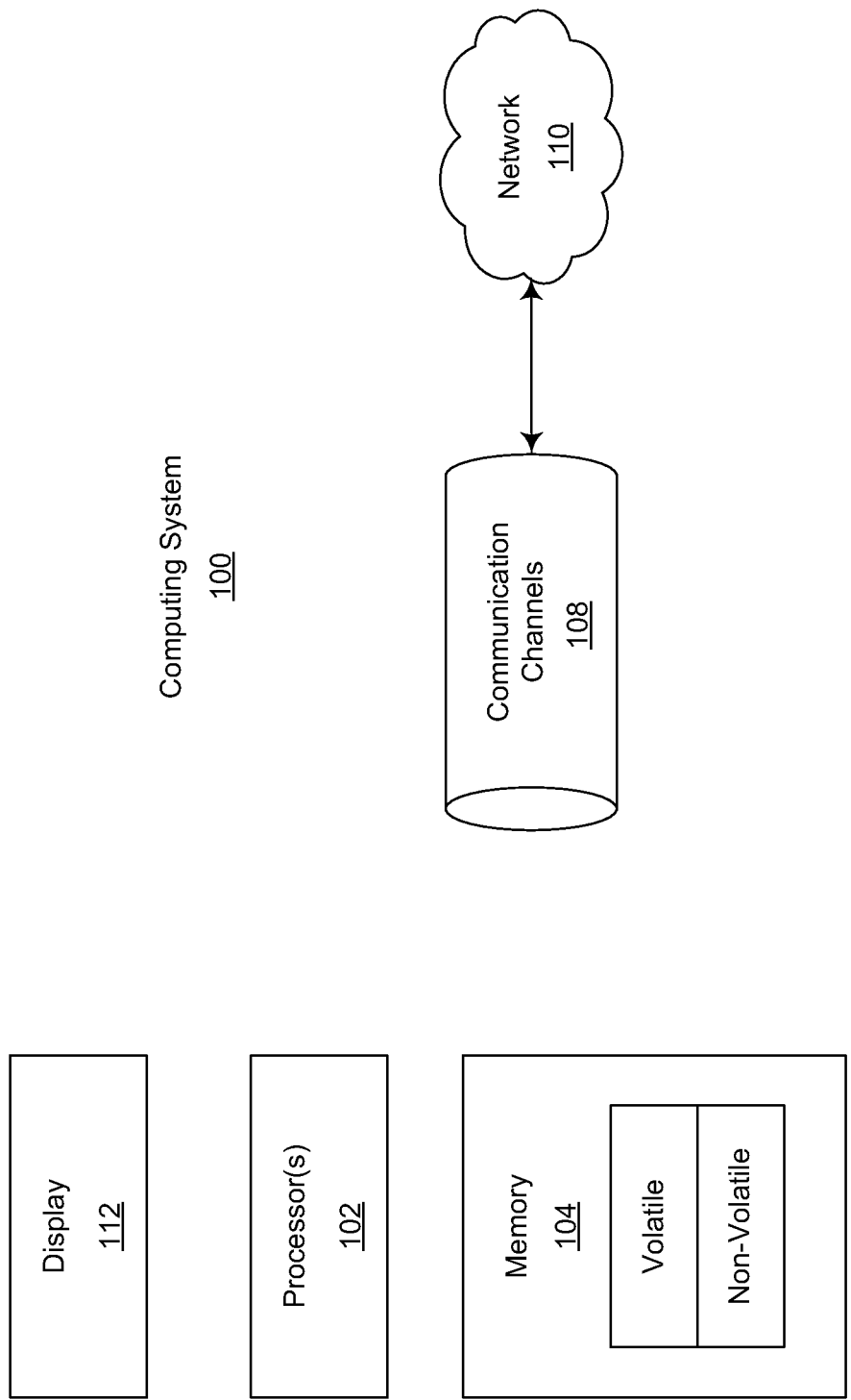
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system may also include a display 112 that may display one or more user interfaces that a user of the computing system may interface with.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
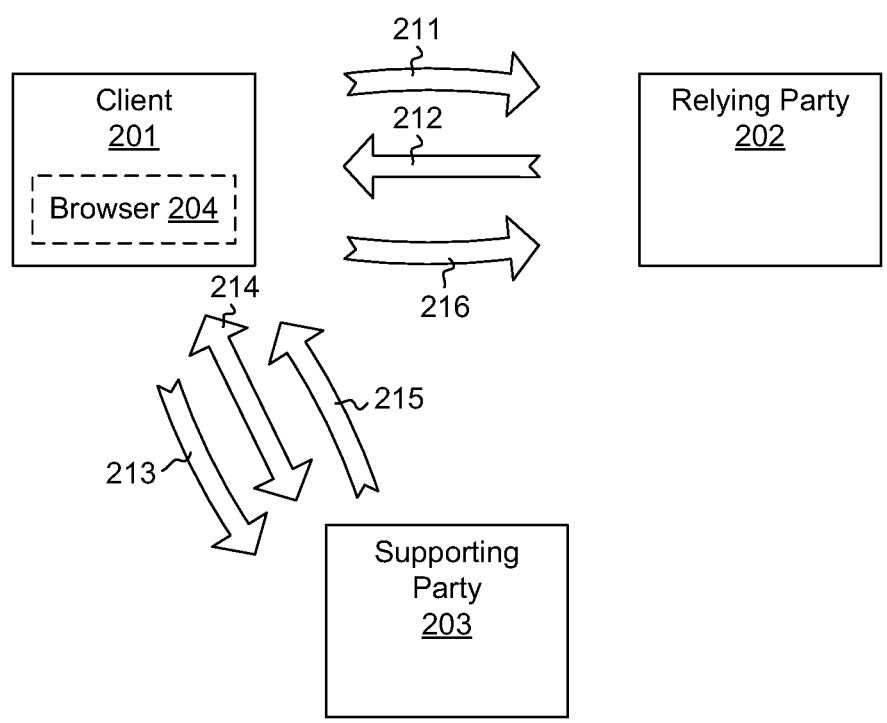
FIG. 2 illustrates a three party environment that includes a client that desires a service be performed, a relying party that performs the service, and a supporting party that performs a supporting service relied upon by the relying party before the relying party provides the desired service to the client.

FIG. 2 illustrates a three party environment 200 that includes a client computing system (hereinafter "client") 201, a relying party computing system (hereinafter "relying party") 202, and a supporting party computing system (hereinafter "supporting party" or "supporting entity") 203. Each of the client 201, the replying party 202, and the supporting entity 203 may be, for example, structured as described above for the computing system 100 of FIG. 1. Optionally, the client 201 includes a browser 204 that may initiate a service request upon navigation to a network site (such as a web site) hosted by the relying party 202.

The client 201 initiates a service request (hereinafter also referred to as "the original service request") to perform a service (hereinafter also referred to as the "primary service") to the relying party 202. The relying party 201 performs the primary service, but only after the client 201 interacts with the supporting party 203 to have a supporting service performed. This may be accomplished by having the relying party 202 redirect the client 201 to the supporting party 203 in response to the original service request.

Figure 3:
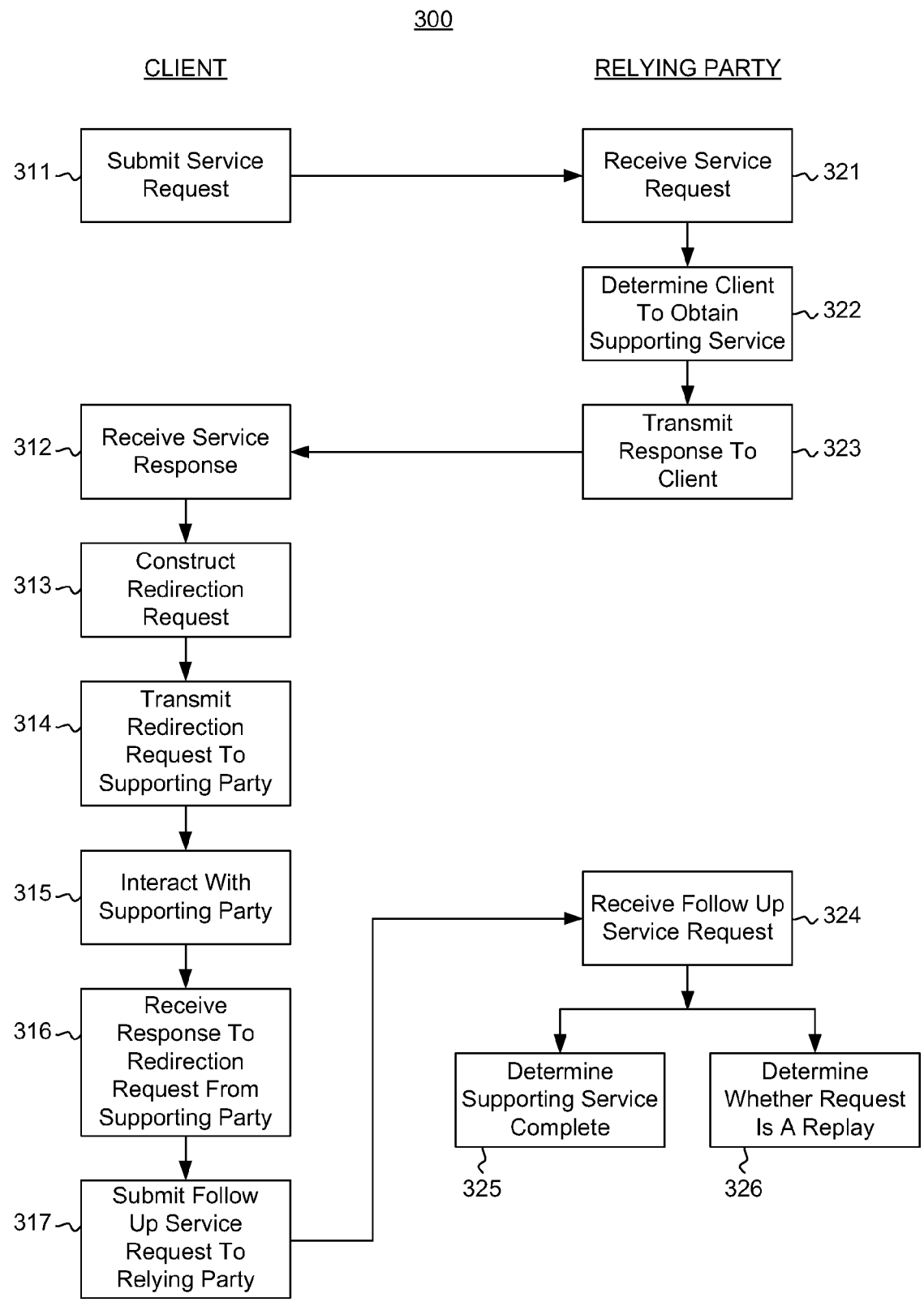
FIG. 3 illustrates a flowchart of a method for facilitating a service request through redirection while reducing the opportunity for performing a replay attack.

The terms "client", "relying party" and "supporting party" with respect to computing system 201, 202, and 203, respectively, are intended to be descriptive of the function of the computing system only with respect to the method 300 of FIG. 3. There is nothing to say that these computing system 201 through 203 may not take on different functionalities in other contexts. For instance, the client 201 may also a relying party or a supporting party in other contexts. The relying party 202 may also be a client or a supporting party in other contexts. The supporting party 203 may also be a client or a relying party in other contents. For instance, the supporting party 203 may require the supporting services of yet another supporting party before the supporting party 203 performs the supporting service for the client 201. Thus, the supporting party 203 may redirect the client 201 yet again to another supporting party (not shown). Thus, the method 300 of FIG. 3 may be performed recursively for two or more levels of redirection. However, to keep the principles described herein easier to read and understand, a single level of redirection is described with respect to FIG. 2.

Of course, redirection is not a new concept. However, the principles described herein use the principles of redirection in a unique way to eliminate or reduce the possibility of replay attacks. A replay attack is a mechanism whereby the browser history may be used to replay a previously-made request to a relying party. In the previously made request, the supporting service was performed (such as authentication). The principles described herein allow the relying party to distinguish the previously made request from the replay of the request.

The various arrows 211 through 216 are illustrated in FIG. 2 to show various interactions between the client 201, the relying party 202, and the supporting party 203. The sequence of interactions is generally in the order shown, with the communication represented by arrow 211 being first, the communication represented by arrow 212 being second, or so forth, concluding with the communication represented by the arrow 216.

FIG. 3 illustrates a flowchart of a method 300 for facilitating a service request through redirection while reducing the opportunity for performing a replay attack. The method 300 will be described with frequent reference to FIG. 2, and will help to further describe in further detail the flow (represented by arrows 211 through 216) of communication in the environment 200. Referring to FIG. 3, some of the acts performed in the method 300 are performed by the client 201 and are included in the left column of FIG. 3 under the heading "CLIENT". Others of the acts are performed by the relying party 202 and are included in the right column of FIG. 3 under the heading "RELYING PARTY".

The method 300 is initiated upon the client 201 submitting a service request to the relying party 202 (act 311). The relying party 202 then receives the service request (act 312). This transmission is represented in FIG. 2 with arrow 211. The service request could be any service request for a service offered by the relying party 201. While the principles described herein do not exclude the possibility that the relying party 202 may sometimes be able to perform the primary service without requiring a supporting service, in the context of FIGS. 2 and 3, the relying party 201 determines that client is to first obtain supporting service from a supporting party computing system before the service request is to be honored (act 322).

As an example, suppose that the relying party 202 requires authentication of the client 201 before performing the primary service. In that case, the supporting service may be authentication or other identity providing service, and the supporting party may be an identity provider. As another example, suppose that the relying party 202 needs to determine whether some claims are true (e.g., payment has been made, the user of the client has government clearance, the user has a valid driver's license, the user has health insurance, the user is a relative of an authorized user and so forth), the supporting service would be the providing of a claim regarding the user, and the supporting party would be a claims provider.

In order for the relying party 202 to have the client 201 interact with the supporting party 203 to having the supporting service performed, the relying party transmits a response to the service request to the client 201 (act 323). The client 201 then receives the response to the service request (act 312). This transmission is represented in FIG. 2 by arrow 212.

Figure 4:
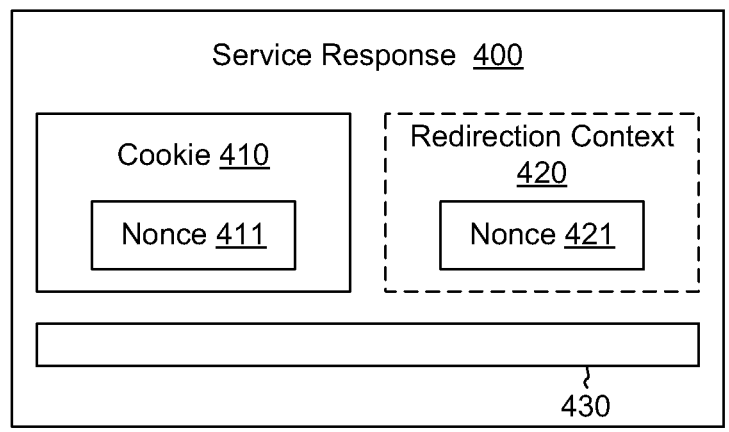
FIG. 4 schematically illustrates a structure of a response to a service request, the service request issued from the client to the relying party, but the response returned from the relying party to the client.

FIG. 4 schematically shows the response 400 in which at least some of the content of the response is illustrated. The response 400 includes a cookie 410. A cookie is a data structure that when returned by the relying party is stored on the client, and is correlated with that relying party. While the term is typically used in the context of the application being a browser, the term "cookie" as used herein is broader in that it is defined as any structure that is returned to the relying party in a subsequent service request. Thus, whenever a subsequent request is made to the relying party, unless the cookie has been deleted in the interim, that cookie will be returned to the relying party, allowing the relying party access to the cookie contents. In this case, the cookie 410 includes a "nonce" 411. In this description and in the claims, a "nonce" is a value that is used only once between the client and the relying party at least within the valid time of the nonce.

Referring again to FIG. 4, the response also includes a nonce 421 in a redirection context 420. The redirection context 420 is interpretable by the client 201, such that when the client 201 submits the redirection request to the supporting party 203, the client 201 includes the nonce 421 in a particular context. That particular context likewise causes the supporting party to return the nonce in a particular context that forces the client to yet again include the nonce when submitting the followup service request to the relying party. As an example, the nonce could be included in a context string. The context string is a mechanism by which the relying party may basically echo back the contents of the context string from the supporting party through the client. In one embodiment, the relying party 203 itself creates the context string, which is included by the client 201 in the redirection requested to the supporting party 202, whereupon the supporting party 202 echoes back the context string to the client 201 in the response to the redirection request.

The nonce 411 in the cookie 410 is correlated to the nonce 421 in the redirection context 420. For instance, the nonce 411 in the cookie 410 may match the nonce 421 in the redirection context 420. Accordingly, when the cookie 420 and the nonce 421 are returned, the relying party may expect the nonces 411 and 421 to match, and if they do not, the relying party may determine that something has gone wrong with the normal process.

Figure 5:
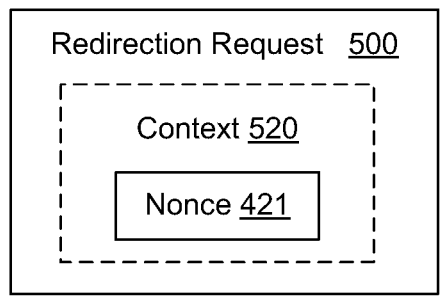
FIG. 5 schematically illustrates a structure of a redirection request from a client to a supporting party.

Since the response 400 also includes a redirection instruction 430, the client 201 responds to the response 400 by constructing a redirection request to the supporting party to perform a supporting service (act 313), and transmits that redirection request to the supporting party (act 314). As an example, in the context of the browser 204, the redirection instruction 430 may an indication of the address of the supporting party with a query string that specifies the context string. FIG. 5 shows the redirection request 500 and at least some of its contents. The redirection request 500 includes the nonce 421. The client 201 included the nonce 421 in the redirection request because the relying party included the nonce 421 in the redirection context 420 in the response 400. The nonce 421 is included in a particular context 520 in the redirection context that will cause the supporting party to return the nonce 421 back to the client in the response to the redirection request.

The client then transmits the redirection request to the supporting party (see arrow 213 in FIG. 2). Optionally, the client may also perform other interaction with the supporting party (see arrow 214 in FIG. 2) (act 315) to facilitating the supporting service. For instance, if the supporting party were an identity service provider, the supporting party may prompt the user of the client for credentials, and the user may provide such credentials through the client. Upon completing the supporting service, the supporting party then provides a response to the redirection request to the client (represented by arrow 215) (act 316).

Figure 6:
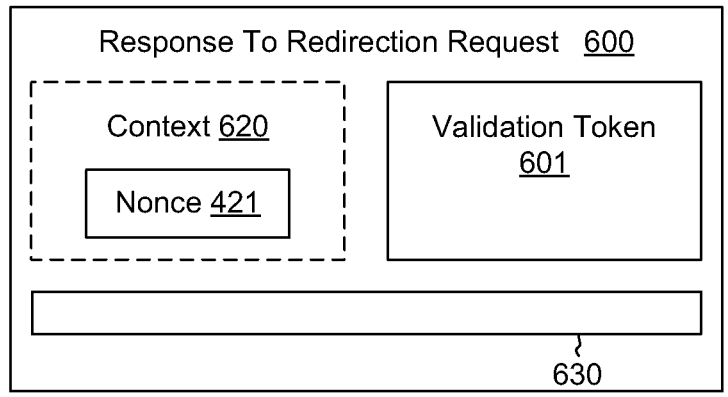
FIG. 6 schematically illustrates a structure of a response to a redirection request, the response issued from the supporting party to the client.

FIG. 6 illustrates a response 600 to the redirection request, along with at least some of its contents. The nonce 421 is returned in the response 600, since the nonce 421 was included in the redirection request 500 in the context 520. Here, the nonce 421 is included in a context 620 and a redirection instruction 630 that will cause the client to include the nonce in a followup service request. The response 600 also includes a validation token 601 that would be interpretable by the relying party to give assurance that the supporting service has been performed. As an example, the redirection instruction 630 may be executable code that is automatically executed by the client computing system to cause the client computing system to construct and transmit (act 317) a followup service request (such as that described with respect to FIG. 7) to the relying party (see arrow 216 in FIG. 2).

Figure 7:
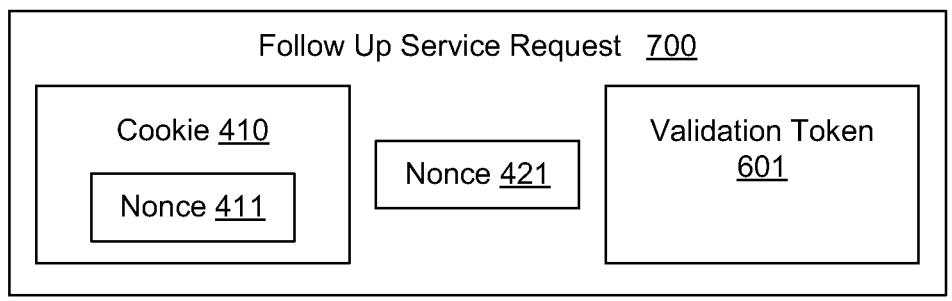
FIG. 7 schematically illustrates a structure of a followup service request from the client to the relying party.

FIG. 7 illustrates the followup service request 700 and at least some of its contents. The followup service request 700 in includes the validation token 601 and the nonce 421 that was returned by the supporting party. However, the followup service request 700 also includes the cookie 410 that was provided by the relying party to the client in response to the original service request. Recall that that cookie 410 includes the nonce 411. The nonce 411 may have been signed and/or encrypted within the cookie 410 to avoid tampering. The relying party then receives the followup service request from the client (act 324).

Given the contents of the followup service request, the relying party determines whether the supporting service was completed by the supporting party computing system by evaluating the validation token in the followup service request (act 325). For instance, if the supporting party were an identity provider, the relying party may authenticate the client or its user without actually having to perform the authentication. However, the relying party may also determine whether the followup service request is a replay of the prior service request (act 326) by evaluating the nonces in the followup service requests.

Figure 8:
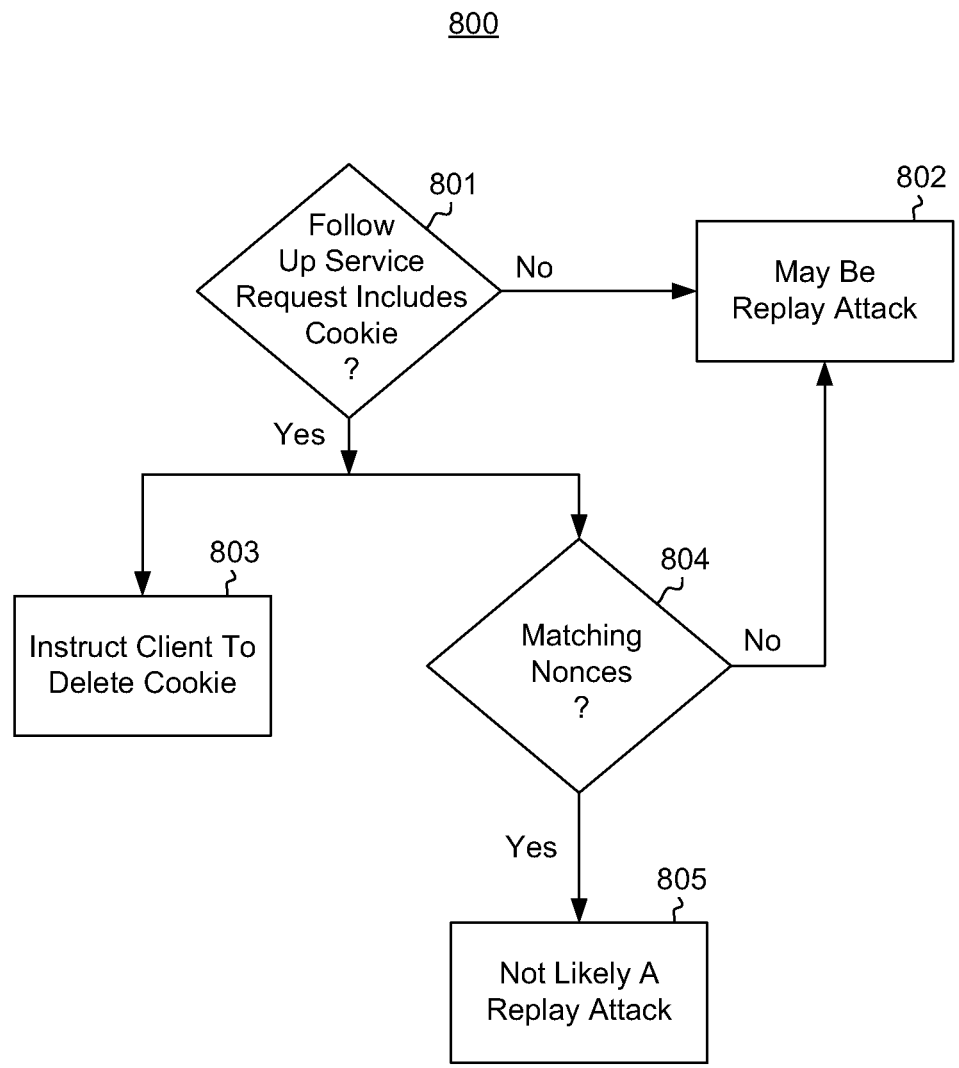
FIG. 8 illustrates a flowchart of a method performed by the relying party to determine whether the followup service request is a replay attack.

FIG. 8 illustrates a flowchart of a method 800 performed by the relying party to determine whether the followup service request is a replay attack. The method 800 is one example of act 326 of FIG. 3. The relying party first determines whether or not the cookie 410 is even present in the followup service request (decision block 801). If the cookie 410 is not present (No in decision block 801), then the cookie has been deleted at the client, or otherwise is prevented from being included in the followup service request. This is symptomatic of preparations made for a replay attack, or at the very least removes the ability to compare the nonces 411 and 421, which is the basis for determine whether a replay attack is occurring. Accordingly, if no cookie 410 is present in the followup service request (No in decision block 801), then there may be a replay attack occurring (act 802). One appropriate response to that situation would be to deny the followup service request, or perform the method 300 again, which would require the requestor to interface with the supporting party to again perform the supporting service.

If there is a cookie 410 in the followup service request (Yes in decision block 801), then the client is instructed to delete the cookie 410 (act 803) from its stores so that it is no longer used in further followup service requests to the relying party. Furthermore, the relying party extracts the nonce 411 from the cookie 410. This may involve decrypting the nonce and/or confirming through the signature of the nonce that the nonce 411 has not been tampered with since the relying party provided the nonce 411 to the client. The relying party then compares the nonce 411 from the cookie 410 with the nonce 421 returned by the supporting party. In the most straightforward implementation, the nonce 411 is determined to "match" the nonce 421 ("Yes" in decision block 804) if they are exactly equal values. However, the nonce 411 may have any other correlation with the nonce 421 that is determined to be the expected "match". By comparing the nonces 411 and 421, the relying party can determine that the followup service request is in direct response to the client having interacted with the supporting party in response to the redirection instruction.

If there is a match in the nonces (Yes in decision block 804), then a replay attack is not detected (act 805). However, if the nonces do not match (No in decision block 804), then this may be a replay attack (act 802). For instance, the cookie returned in the followup service request may be from a much earlier redirection request corresponding to a service request that was long ago completed. If the unauthorized user then tried to use the browser history to replay the followup service request, the cookie would either not be present, or the nonce would not match.

Accordingly the principles described herein provide a more secure mechanism for avoiding replay attacks in the context in which a relying party redirects a client to a supporting party (such as an identity provider) for purposes of performing a supporting service (such as authentication).

In one embodiment, once the relying party 202 proves that the followup service request is not a replay attack, the relying party 202 may cause a cookie (i.e., a "second cookie" to distinguish this cookie from the cookie 410) to be placed on the client computing system. The client 201 may make a request to the relying party 202 and the relying party will honor that request at least during a particular duration (e.g., during the time of the session), without redirecting the client 201 to the supporting party 203. In some embodiments, this second cookie may be used in a single sign-on (SSO) experience in which the cookie may also be recognized by other relying parties other than the relying party 202. For instance, suppose that relying party 202 is called "relaying party A". Now suppose that relying parties A and B can both write cookies that the other can read. If relying party A has already interacted indirectly (through the client) with the supporting party in accordance with the method 300 resulting in the creation of the mutually-respected second cookie, replying party B does not have to repeat the interaction with the supporting party, but instead just recognizes the mutually-respected second cookie.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer storage devices having thereon computer-executable instructions that are structured such that, when executed by one or more processors of a client computing system, cause the client computing system to perform the following:
    an act of submitting a service request to a relying party computing system;
    an act of receiving a response to the service request from the relying party, the response including a cookie that includes a first nonce, a redirection context that includes a second nonce, and an instruction to redirect to a supporting party computing system;
    in response to the response from the relying party computing system, an act of constructing a redirection request to the supporting party computing system to perform a supporting service, the redirection request including the second nonce as a result of the client computing system interpreting the redirection context;
    an act of receiving a response to the redirection request from the supporting party computing system, the response including the second nonce, and including a validation token of the supporting service provided by the supporting party computing system; and
    in response to the response from the supporting party computing system, an act of submitting a followup service request to the relying party computing system, the followup service request including the cookie that includes the first nonce, and including the validation token and the second nonce included in the response from the supporting party computing system.

2. The computer program product in accordance with claim 1, wherein the second nonce in a redirection context is included in a context string such that the response to the redirection request also includes the second nonce in the context string.

3. The computer program product in accordance with claim 1, wherein the response to the redirection request also includes executable code that is automatically executed by the client computing system to cause the client computing system to perform the act of submitting the followup service request to the relying party computing system.

4. The computer program product in accordance with claim 1, wherein the supporting service is an authentication service that generates the validation token that is interpretable by the relying party computing system as authenticating the client computing system.

5. The computer program product in accordance with claim 1, wherein the cookie is a first cookie, wherein the client computing system further performs the following in response to an instruction from the relying party computing system in response to the followup service request:
    an act of deleting the first cookie.

6. The computer program product in accordance with claim 5, wherein the cookie is a first cookie, wherein the client computing system further performs the following in response to an instruction from the relying party computing system in response to the followup service request:
    an act of storing a second cookie that includes session context.

7. The computer program product in accordance with claim 1, wherein the cookie is a first cookie, wherein the client computing system further performs the following in response to an instruction from the relying party computing system in response to the followup service request:
    an act of storing a second cookie that includes session context.

8. A computer program product comprising one or more computer storage devices having thereon computer-executable instructions that are structured such that, when executed by one or more processors of a relying party computing system, cause the relaying party computing system to perform the following:
    an act of detecting receipt of a service request from a client computing system;
    an act of determining that the client computing service is to first obtain supporting service from a supporting party computing system before the service request is to be honored;
    an act of transmitting a response to the service request to the client computing system, the response including a cookie that includes a first nonce, a redirection context that includes a second nonce, and an instruction to redirect to the supporting party computing system;
    after transmitting the response to the service request to the client computing system, an act of receiving a followup service request from the relying party computing system, the followup service request including a service token provided by the supporting party computing system, and the second nonce as returned by the supporting party computing party computing system; and
    an act of determining whether or not the followup service request also includes the cookie that includes the first nonce.

9. The computer program product in accordance with claim 8, wherein the computer-executable instructions are structured such that if it is determined that the followup service request does not include the cookie, the relying party computing system denies the followup service request.

10. The computer program product in accordance with claim 8, wherein the computer-executable instructions are structured such that if the followup service request does include the cookie that includes the first nonce, the relying party computing system further performs the following:
    an act of determining whether the first nonce included in the cookie matches the second nonce as returned by the supporting party computing system.

11. The computer program product in accordance with claim 10, wherein the computer-executable instructions are structured such that if the followup service request does include the cookie that includes the first nonce, the relying party computing system further performs the following:
    an act of instructing the client computing system to delete the cookie.

12. The computer program product in accordance with claim 10, wherein the computer-executable instructions are structured such that if the first nonce in the cookie matches the second nonce as returned by the supporting party computing system, the relying party further performs the following:
an act of determining that the supporting party computing service has indeed performed the supporting service to the client computing system.

13. The computer program product in accordance with claim 10, wherein the computer-executable instructions are structured such that if the first nonce in the cookie matches the second nonce as returned by the supporting party computing system, the relying party computing system further performs the following:
an act of instructing the client computing system to delete the first cookie.

14. The computer program product in accordance with claim 13, wherein the cookie is a first cookie, wherein the computer-executable instructions are structured such that if the first nonce in the cookie matches the second nonce as returned by the supporting party computing system, the relying party computing system further performs the following:
an act of providing a second cookie to the client computing system, the second cookie including session context.

15. The computer program product in accordance with claim 10, wherein the computer-executable instructions are structured such that if the first nonce in the cookie does not match the second nonce as returned by the supporting party computing system, the relying party further performs the following:
an act of denying the followup service request.

16. The computer program product in accordance with claim 8, wherein the supporting service is an identity provider service.

17. The computer program product in accordance with claim 8, wherein the supporting service is a claim providing service.

18. The computer program product in accordance with claim 8, wherein the first nonce that is included in the cookie is a signed nonce.

19. The computer program product in accordance with claim 8, wherein the first nonce that is included in the cookie is an encrypted nonce.

20. A method for using a supporting service computing system to facilitate a request from a browser computing system to a relying party computing system, the method comprising:
an act of the browser computing system submitting a service request to a relying party computing system;
an act of the relying party computing system receiving the service request;
in response to the service request, an act of the relying party computing system determining that the browser computing service is to first obtain supporting service from a supporting party computing system before the service request is to be honored;
an act of the relying part computing system transmitting a response to the service request to the browser computing system, the response including a cookie that includes a first nonce, a redirection context including a second nonce, and an instruction to redirect to the supporting party computing system;
an act of the browsing computing system receiving the response to the service request;
in response to the response from the relying party computing system, an act of the browsing computing system redirecting to the supporting party computing system to perform a supporting service, the redirection request including the second nonce as a result of the browser interpreting the redirection context;
an act of the browsing computing system receiving a response to the redirection request from the supporting party computing system, the response including the second nonce, and including a validation token of the supporting service provided by the supporting party computing system; and
in response to the response from the supporting party computing system, an act of the browsing computing system submitting a followup service request to the relying party computing system, the followup service request including the cookie that includes the first nonce, and including the validation token and the second nonce included in the response from the supporting party computing system;
an act of the relying party computing system receiving the followup service request from the browsing computing system; and
an act of the relying party computing system determining whether the supporting service was completed by the supporting party computing system by evaluating the service token in the followup service request; and
an act of the relying party computing system determining that the followup service request is not a replay of a prior service request by evaluating the validation token in the followup service request.

* * * * *